United States Patent
Hu et al.

(10) Patent No.: US 10,411,627 B2
(45) Date of Patent: Sep. 10, 2019

(54) AC EXCITATION SYNCHRONOUS CONDENSER AND CONTROL METHOD THEREOF

(71) Applicant: Huazhong University of Science and Technology, Wuhan (CN)

(72) Inventors: Jiabing Hu, Wuhan (CN); Yuanzhu Chang, Wuhan (CN); Enbo Zhang, Wuhan (CN); Xiaoming Yuan, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 0 days.

(21) Appl. No.: 15/933,856

(22) Filed: Mar. 23, 2018

(65) Prior Publication Data
US 2019/0199255 A1 Jun. 27, 2019

(30) Foreign Application Priority Data
Dec. 25, 2017 (CN) .......................... 2017 1 1416473

(51) Int. Cl.
*H02P 9/08* (2006.01)

(52) U.S. Cl.
CPC ................ *H02P 9/08* (2013.01); *Y02E 40/30* (2013.01)

(58) Field of Classification Search
USPC .......................................... 290/44, 4; 322/32
See application file for complete search history.

(56) References Cited

U.S. PATENT DOCUMENTS

| | | | | |
|---|---|---|---|---|
| 4,743,777 A * | 5/1988 | Shilling | ................ | F02N 11/04 290/31 |
| 4,968,926 A * | 11/1990 | Dhyanchand | ........... | F02N 11/04 290/38 R |
| 5,013,929 A * | 5/1991 | Dhyanchand | ........... | F02N 11/04 290/31 |
| 5,015,941 A * | 5/1991 | Dhyanchand | ........... | F02N 11/04 290/38 R |
| 5,029,263 A * | 7/1991 | Rozman | ................ | F02N 11/04 318/400.22 |
| 5,113,125 A * | 5/1992 | Stacey | .................... | H02P 25/03 318/400.2 |
| 5,140,245 A * | 8/1992 | Stacey | ................... | G08C 19/42 318/723 |
| 5,444,349 A * | 8/1995 | Rozman | ................. | F02N 11/04 318/400.41 |
| 5,512,811 A * | 4/1996 | Latos | ...................... | F02N 11/04 322/10 |
| 5,798,631 A * | 8/1998 | Spee | .................... | F03D 7/0272 290/31 |

(Continued)

*Primary Examiner* — Pedro J Cuevas
(74) *Attorney, Agent, or Firm* — Maier & Maier, PLLC (57) ABSTRACT

An AC excitation synchronous condenser and a control method, an AC-excitation induction machine, a full-controlled AC excitation converter, a grid-side converter and a controller. The AC-excitation induction machine is the core power converting device, and its stator and rotor windings are AC windings with terminals. The controller is configured to control the full-controlled AC excitation converter to perform excitation and speed regulation on the AC-excitation induction machine and also control the grid-side converter to ensure the excitation capability of the full-controlled AC excitation converter, so that support and regulation of the active power and reactive power are achieved.

8 Claims, 3 Drawing Sheets

(56) References Cited

U.S. PATENT DOCUMENTS

| | | | | |
|---|---|---|---|---|
| 6,784,634 B2* | 8/2004 | Sweo | H02P 9/007 | 290/46 |
| 6,909,262 B2* | 6/2005 | Yao | H02P 9/105 | 322/22 |
| 6,954,004 B2* | 10/2005 | Skeist | H02P 9/007 | 290/44 |
| 7,075,267 B1* | 7/2006 | Cheng | H02M 7/53875 | 318/432 |
| 7,411,309 B2* | 8/2008 | Hudson | F03D 7/0272 | 290/44 |
| 8,248,039 B2* | 8/2012 | Cao | F03D 7/0272 | 290/44 |
| RE43,698 E* | 10/2012 | Hudson | F03D 7/0272 | 290/44 |
| 8,384,318 B2* | 2/2013 | Beck | H02P 27/06 | 318/143 |
| 8,395,336 B2* | 3/2013 | Lai | H02P 21/09 | 318/400.02 |
| 8,773,080 B2* | 7/2014 | Albsmeier | H02P 9/04 | 322/24 |
| 8,848,400 B2* | 9/2014 | Yuan | G05F 1/70 | 323/207 |
| 8,884,566 B2* | 11/2014 | Cao | H02P 21/00 | 318/400.2 |
| 8,928,293 B1* | 1/2015 | Rozman | H02P 9/14 | 290/31 |
| 9,190,923 B2* | 11/2015 | Yuan | H02M 1/00 | |
| 9,667,232 B2* | 5/2017 | Kuznetsov | H02J 3/30 | |
| 9,735,702 B2* | 8/2017 | Hu | H02M 7/483 | |
| 9,748,882 B1* | 8/2017 | Breheny | B65G 1/0492 | |
| 9,837,996 B2* | 12/2017 | Kuznetsov | H03K 3/45 | |
| 10,084,403 B2* | 9/2018 | Yuan | H02P 9/105 | |
| 10,122,307 B2* | 11/2018 | Gieras | H02P 9/007 | |
| 10,141,874 B2* | 11/2018 | Blackwelder | H02P 9/08 | |
| 10,260,471 B2* | 4/2019 | Huang | F02N 11/04 | |
| 10,263,553 B2* | 4/2019 | Blackwelder | H02P 9/105 | |
| 10,298,212 B2* | 5/2019 | Kuznetsov | H03K 3/45 | |
| 10,312,849 B2* | 6/2019 | Huang | F02N 11/04 | |
| 2003/0052643 A1* | 3/2003 | Sweo | H02P 9/007 | 318/801 |
| 2013/0134710 A1* | 5/2013 | Yuan | H02M 1/00 | 290/44 |
| 2013/0207622 A1* | 8/2013 | Yuan | G05F 1/70 | 323/207 |
| 2016/0197600 A1* | 7/2016 | Kuznetsov | H03K 3/45 | 307/106 |
| 2016/0285400 A1* | 9/2016 | Yuan | H02P 9/105 | |
| 2016/0336928 A1* | 11/2016 | Kuznetsov | H02J 3/30 | |
| 2017/0170660 A1* | 6/2017 | Hu | H02M 7/483 | |
| 2019/0109904 A1* | 4/2019 | Binder | H04L 67/12 | |
| 2019/0173403 A1* | 6/2019 | Blackwelder | H02P 9/14 | |
| 2019/0207542 A1* | 7/2019 | Blackwelder | H02P 9/105 | |

* cited by examiner

AC EXCITATION SYNCHRONOUS CONDENSER AND CONTROL METHOD THEREOF

FIELD

The invention belongs to the field of research and manufacture of key power equipment in power system, and more particularly relates to an alternating current (AC) excitation synchronous condenser and a control method thereof.

BACKGROUND

With the pattern of "large-scale development and long-distance transportation" of clean energy power generation, a higher proportion of power energy will be sent from the external transmission channels, especially the direct current (DC) transmission channels to the load center. As a result, load-center power grids will surely develop into typical weak receiving-end power grids with limited local power supply. In order to ensure the power supply reliability and power quality of the weak receiving-end power grid, the weak receiving-end power grid must have the following three capabilities: 1) rapid dynamic reactive power support capability; 2) economic reactive power regulation capability; and 3) adequate inertia support capability.

The synchronous condenser based on synchronous machine can play a role in regulating the reactive power and supporting the local grid voltage through adjusting its excitation voltage. However, due to its large time constant of the exciting windings, the synchronous condenser cannot achieve rapid regulation of the dynamic reactive power. In addition, since the synchronous condenser is based on DC excitation and not driven by a prime mover, when the condenser is in operation, the rotate speed of the condenser must be maintained within a safe range near the synchronous speed. Thus, when the frequency disturbance occurs in the system, the inertia support that the synchronous condenser based on synchronous machine can release is very limited, namely, the demand of the weak receiving-end power grid for the inertia support cannot be met.

The Static Var Generator (SVG) based on fully-controlled power electronic device can achieve fast reactive power regulation. However, due to the converter's direct connection with the power grid, the actual capacity and regulation capability of the equipment are constrained by the device capacity, which results in high cost and poor economy. In addition, SVG cannot provide inertia support for the system due to its own operational characteristics.

If the traditional reactive power compensation equipment are used to enhance the three capacities required by the weak receiving-end power grid, we will inevitably face the problem of a large amount of repeated construction, and taking into account the very expensive cost of SVG and the weaker inertia support capacity of the synchronous condenser, such repeated construction must be unacceptable.

In general, the existing reactive power regulation devices cannot meet both the fast and economical requirements of the reactive power support as well as the considerable inertia support capability.

SUMMARY OF THE INVENTION

In view of the defects and improvement requirements in the existing prior art, it is one objective of the invention to provide an AC excitation synchronous condenser and a control method thereof, which aims to solve the problem that the existing reactive power regulation devices of the power grid cannot meet both the fast and economical requirements of the reactive power support of the power grid as well as the requirement for the considerable inertia support capability.

In order to achieve the above objective, according to a first aspect of the invention, there is provided an AC excitation synchronous condenser, comprising: an AC-excitation induction machine, a full-controlled AC excitation converter, a grid-side converter and a controller; the AC-excitation induction machine is the core power converting device, and its stator and rotor windings are AC windings with terminals; the controller is configured to process voltage, current and rotating speed signals so as to generate an excitation voltage command for the full-controlled AC excitation converter and control voltage command for the grid-side converter; the full-controlled AC excitation converter is configured to receive the excitation voltage command and perform independent regulation on the active power and the reactive power of the AC-excitation induction machine; and the grid-side converter is configured to receive the control voltage command and regulate the active power so as to maintain the stability of the DC bus voltage, so that it is ensured that the full-controlled AC excitation converter has sufficient excitation control capability.

Further, the controller comprises: an event and command control module, a rotating speed and reactive power control module, an excitation current control module and a DC voltage control module;

The event and command control module has a first input terminal for receiving a superior reactive power command $Q_{in}{}^*$ and a second input terminal for receiving voltage and frequency signals of the local power grid, and is configured to receive the superior reactive power command $Q_{in}{}^*$, collect a measured voltage U and a measured frequency f and then process the input signals according to a working mode, a rated voltage $U_N$, a rated frequency $f_N$, a maximum rotating speed command $\omega_{r\ max}{}^*$ and a minimum rotating speed command $\omega_{r\ min}{}^*$ that are preset, so as to obtain a reactive power command $Q^*$ and a rotating speed command $\omega_r{}^*$;

The rotating speed and reactive power control module has a first input terminal which is connected to a first output terminal of the event and command control module, a second input terminal which is connected to a second output terminal of the event and command control module, a third input terminal for receiving an instantaneous reactive power Q output from the AC excitation synchronous condenser to the local power grid and a fourth input terminal for receiving a measured rotating speed $\omega_r$ of the AC-excitation induction machine, and is configured to receive the reactive power command $Q^*$ and the rotating speed command $\omega_r$, collect the instantaneous reactive power Q and the measured rotating speed $\omega_r$ and then process the input signals according to a rotor maximum reactive current command $I_{rq\ max}{}^*$, a rotor minimum reactive current command $I_{rq\ min}{}^*$, a rotor maximum active current command $I_{rd\ max}$ and a rotor minimum active current command $I_{rd\ min}$ that are preset, so as to obtain a rotor reactive current command $I_{rq}{}^*$ and a rotor active current command $I_{rd}{}^*$;

The excitation current control module has a first input terminal which is connected to a first output terminal of the rotating speed and reactive power control module, a second input terminal which is connected to a second output terminal of the rotating speed and reactive power control module and a third input terminal for receiving current signals, and is configured to receive the rotor reactive current command $I_{rq}{}^*$ and the rotor active current command $I_{rd}*$, collect a rotor active current $I_{rd}$, a rotor reactive current $I_{rq}$, a stator active current $I_{sd}$ and a stator reactive current $I_{sq}$ of the AC-excitation induction machine as well as a slip frequency angular velocity $\omega_s$, and then process the input signals according to a maximum excitation current capacity $I_{max}$ of the full-controlled AC excitation converter, an excitation inductance $L_m$ of the AC-excitation induction machine and a rotor inductance $L_r$ of the AC-excitation induction machine, so as to obtain an excitation voltage command for the full-controlled AC excitation converter, so that the full-controlled AC excitation converter is controlled to perform AC excitation of the AC-excitation induction machine The DC voltage control module has a first input terminal for receiving a DC bus voltage $U_{dc}$ and a second input terminal for receiving voltage and current signals of the local power grid, and is configured to receive the DC bus voltage $U_{dc}$, collect an active current $I_{gd}$ and a reactive current $I_{gq}$ output from the grid-side converter, a d-axis component $U_{gd}$ and a q-axis component $U_{gq}$ of a voltage at the access point of the grid-side converter and a power grid voltage angular velocity $\omega_1$, and then process the input signals according to a DC bus voltage command $U_{dc}*$, a resistance $R_g$ of a filter in the grid-side converter and an inductance $L_g$ of the filter in the grid-side converter to obtain a control voltage of the grid-side converter, so as to maintain the stability of the DC bus voltage, so that it is ensured that the full-controlled AC excitation converter has sufficient excitation control capability.

The DC bus voltage command $U_{dc}*$, the rated voltage $U_N$, the rated frequency $f_N$, the maximum rotating speed command $\omega_{r\ max}*$, the minimum rotating speed command $\omega_{r\ min}*$, the rotor maximum reactive current command $I_{rq\ max}*$, the rotor minimum reactive current command $I_{rq\ min}*$, the rotor maximum active current command $I_{rd\ max}*$ and the rotor minimum active current command $I_{rd\ min}*$ are preset parameters according to actual working conditions; and the maximum excitation current capacity $I_{max}$ of the full-controlled AC excitation converter C, the excitation inductance $L_m$ of the AC-excitation induction machine B, the rotor inductance $L_r$ of the AC-excitation induction machine B, the resistance $R_g$ of the filter in the grid-side converter D and the inductance $L_g$ of the filter in the grid-side converter D are parameters of the device itself.

Further, the AC excitation synchronous condenser further comprises a variable inertia connection mechanism which is connected to a rotating mechanism of the AC-excitation induction machine and changes the moment of inertia of the rotating mechanism of the AC-excitation induction machine through an additional connecting member or mass member, so as to change the ability of the rotating mechanism of the AC-excitation induction machine to store mechanical energy.

Further, the additional connecting member or mass member of the variable inertia connection mechanism for changing the moment of inertia of the rotating mechanism of the AC-excitation induction machine includes a flywheel, an emergency accelerating mechanism and an emergency braking mechanism. Preferably, a flywheel is connected to the variable inertia connection mechanism A to enhance the active power regulation capability of the rotating mechanism of the AC-excitation induction machine.

The active power support provided by the AC excitation synchronous condenser to the power grid comes from mechanical energy stored in the variable inertia connection mechanism and the rotor of the AC-excitation induction machine; the reactive power support provided by the AC excitation synchronous condenser to the power grid comes from excitation of the AC-excitation induction machine performed by the full-controlled AC excitation converter and reactive power provided by the grid-side converter to the power grid; and the controller is configured to control the balance between the mechanical energy and the electric energy in the AC excitation synchronous condenser and the external supporting behavior.

Further, both stator and rotor windings in the AC-excitation induction machine are AC windings with terminals, in which the stator winding is directly connected to the power grid through a grid-connected mechanism, and the rotor winding is connected to the full-controlled AC excitation converter.

Further, the grid-side converter has bi-directional power flow capability, namely, being able to not only absorb active power or reactive power from the power grid, but also release active power or reactive power to the power grid so as to maintain the stability of the DC bus voltage.

Further, frequency modulation and reactive power regulation are further implemented by additionally adding an energy storage device to the grid-side converter.

Further, connection between the full-controlled AC excitation converter and the grid-side converter includes direct connection and indirect connection through a converter.

Further, the converters in the full-controlled AC excitation converter and the grid-side converter are two-level or multi-level power electronic converters; the connection structure of the full-controlled AC excitation converter and the grid-side converter may be a cascade structure or a multiphase and multiple connection structure.

Further, the controller may adopt a centralized control strategy or a decentralized control strategy.

In conjunction with the first aspect of the present invention, the present invention further provides a control method, comprising the following steps:

S1: obtaining a corresponding reactive power command Q* from the superior command or the local control according to the preset working mode;

S2: obtaining a rotating speed command $\omega_r*$ according to information about a frequency of the local power grid and a motor speed;

S3: obtaining a rotor reactive current command $I_{rq}*$ according to deviation between a measured reactive power of the local power grid and the reactive power command;

S4: obtaining a rotor active current command $I_{rd}*$ according to deviation between a measured rotating speed of the AC-excitation induction machine and the rotating speed command;

S5: limiting and allocating the dynamic active current command and reactive current command according to the capacity of the full-controlled AC excitation converter, and obtaining an excitation voltage command for the full-controlled AC excitation converter according to an actual active current command $I_{rdt}*$ and an actual active current command $I_{rqt}*$, for the full-controlled AC excitation converter, so that the full-controlled AC excitation converter performs independent excitation of the AC-excitation induction machine; and S6: calculating an active current command for the grid-side converter according to deviation between a measured DC bus voltage and the DC bus voltage command, and obtaining a control voltage command for the grid-side converter so as to maintain the stability of the DC bus voltage, so that it is ensured that the full-controlled AC excitation converter has sufficient excitation control capability.

In the steps S1 to S6, methods for calculating the output signal based on the input signal includes: a proportion-based calculation method, a proportional-integral adjustment method without static error, and an adjustment method based on a set sag curve. Preferably, in the steps S1 to S6, the method for calculating the output signal based on the input signal is the proportional-integral adjustment method without static error so as to reduce the computational complexity and eliminate static errors.

Further, the step S1 specifically includes: receiving a superior reactive power command $Q_{in}^*$ and obtaining a reactive power command $Q^*=Q_{in}^*$, if the set working mode is to obtain a reactive power command from the superior command; or obtaining a measured voltage U of the local power grid and then obtaining a reactive power command $Q^*=K_{pu}(U_N-U)+K_{iu}\int(U_N-U)dt$ (where $K_{pu}$ represents a proportional coefficient of a reactive power regulator, and $K_{iu}$ represents an integration coefficient of the reactive power regulator) through proportional-integral operation, if the set working mode is to obtain a reactive power command from the local control.

Further, the step S2 specifically includes: obtaining a measured frequency f of the local power grid and according to a rated rotating speed synchronization command $\omega_{rN}^*$, a rated frequency $f_N$ of the local power grid, a maximum rotating speed command $\omega_{r\ max}^*$ and a minimum rotating speed command $\omega_{r\ min}^*$ that are preset, obtaining a rotating speed command $\omega_r^*$ through proportional-integral operation, in which the rotating speed command $\omega_r^*$ is calculated by the following formula:

$$\omega_r^* = \begin{cases} \omega_{rmin}^* & \omega_r^* < \omega_{rmin}^* \\ K_{pf}(f-f_N) + K_{if}\int(f-f_N)dt & \omega_{rmax}^* > \omega_r^* > \omega_{rmin}^* \\ \omega_{rmax}^* & \omega_r^* > \omega_{rmax}^* \end{cases},$$

where $K_{pf}$ represents a proportional coefficient of a rotating speed command regulator, and $K_{if}$ represents an integration coefficient of the rotating speed command regulator.

Further, the step S3 specifically includes: obtaining a measured reactive power Q of the local power grid, receiving the reactive power command $Q^*$, and according to a rotor maximum reactive current command $I_{rq\ max}^*$ and a rotor minimum reactive current command $I_{rq\ min}^*$ that are preset, obtaining a rotor reactive current command $I_{rq}^*$ through the proportional-integral operation, in which the rotor reactive current command $I_{rq}^*$ is calculated by the following formula:

$$I_{rq}^* = \begin{cases} I_{rqmin}^* & I_{rq}^* < I_{rqmin}^* \\ K_{pQ}(Q-Q^*) + K_{iQ}\int(Q-Q^*)dt & I_{rqmax}^* > I_{rq}^* > I_{rqmin}^* \\ I_{rqmax}^* & I_{rq}^* > I_{rqmax}^* \end{cases},$$

where $K_{pQ}$ represents a proportional coefficient of a reactive current regulator, and $K_{iQ}$ represents an integration coefficient of the reactive current regulator.

Further, the step S4 specifically includes: obtaining a measured rotating speed $\omega_r$ of the AC-excitation induction machine, receiving the rotating speed command $\omega_r^*$, and according to a rotor maximum active current command $I_{rd\ max}^*$ and a rotor minimum active current command $I_{rd\ min}^*$ that are preset, obtaining a rotor active current command $I_{rd}^*$ through the proportional-integral operation, in which the rotor active current command $I_{rd}^*$ is calculated by the following formula:

$$I_{rd}^* = \begin{cases} I_{rdmin}^* & I_{rd}^* < I_{rdmin}^* \\ K_{p\omega}(\omega_r^*-\omega_r) + K_{i\omega}\int(\omega_r^*-\omega_r)dt & I_{rdmax}^* > I_{rd}^* > I_{rdmin}^* \\ I_{rdmax}^* & I_{rd}^* > I_{rdmax}^* \end{cases},$$

where $K_{p\omega}$ represents a proportional coefficient of a speed regulator, and $K_{i\omega}$ represents an integration coefficient of the speed regulator.

Further, the step S5 specifically includes:

S501: receiving the rotor reactive current command $I_{rq}^*$ and the rotor active current command $I_{rd}^*$;

S502: limiting and allocating the dynamic active current command and reactive current command according to a maximum excitation current capacity $I_{max}$ of the full-controlled AC excitation converter, so as to obtain an actual active current command $I_{rdt}^*$ and an actual reactive current command $I_{rqt}^*$ of the full-controlled AC excitation converter;

S503: obtaining an actual active current $I_{rd}$ of the full-controlled AC excitation converter, an actual reactive current $I_{rq}$ of the full-controlled AC excitation converter, a stator active current $I_{sd}$ of the AC-excitation induction machine, a stator reactive current $I_{sq}$ of the AC-excitation induction machine and a slip frequency angular velocity $\omega_s$;

S504: according to an excitation inductance $L_m$ and a rotor inductance $L_r$ of the AC-excitation induction machine, obtaining a d-axis component $U_{rd}^*$ and a q-axis component $U_{rq}^*$ of the excitation voltage command through the proportional-integral operation, in which the d-axis component $U_{rd}^*$ and q-axis component $U_{rq}^*$ of the excitation voltage command are calculated by the following formulas:

$$\begin{cases} U_{rd}^* = K_{pi}(I_{rdt}^* - I_{rd}) + K_{ii}\int(I_{rdt}^* - I_{rd})dt + R_r I_{rd} - \omega_s(L_m I_{sq} + L_r I_{rq}) \\ U_{rq}^* = K_{pi}(I_{rqt}^* - I_{rq}) + K_{ii}\int(I_{rqt}^* - I_{rq})dt + R_r I_{rq} + \omega_s(L_m I_{sd} + L_r I_{rd}) \end{cases},$$

where $K_{pi}$ represents a proportional coefficient of an excitation current control, and $K_{ii}$ represents an integration coefficient of the excitation current control.

Preferably, in the step S502, the way of limiting and allocating the dynamic active current command and reactive current command is a way that the reactive current is preferred, so as to ensure the reactive power support provided by the AC excitation synchronous condenser to the power grid. After the limitation and allocation, the actual active current command $I_{rdt}^*$ and the actual active current command $I_{rqt}^*$ are calculated by the following formulas:

$$\begin{cases} (I_{rdt}^* = I_{rd}^*, I_{rqt}^* = I_{rq}^*) & \sqrt{I_{rd}^{*2} + I_{rq}^{*2}} \leq I_{max} \\ (I_{rdt}^* = \text{Sgn}(I_{rd}^*)\sqrt{\max(I_{max}^2 - I_{rq}^{*2}, 0)}, I_{rqt}^* = I_{rq}^*) & \sqrt{I_{rd}^{*2} + I_{rq}^{*2}} > I_{max} \end{cases},$$

where $\text{Sgn}(I_{rd}^*) = \begin{cases} 1 & I_{rd}^* > 0 \\ 0 & I_{rd}^* = 0 \\ -1 & I_{rd}^* < 0 \end{cases}.$ Further, the step S6 specifically includes:

S601: receiving a DC bus voltage command $U_{dc}^*$ and obtaining a measured DC bus voltage $U_{dc}$;

S602: according to a maximum active current command $I_{gd\ max}^*$ and a minimum active current command $I_{gd\ min}^*$ output from the grid-side converter, obtaining an active current command $I_{gd}^*$ output from the grid-side converter through proportional-integral operation, in which the active current command $I_{gd}^*$ is calculated by the following formula:

$$I_{gd}^* = \begin{cases} I_{gdmin}^* & I_{gd}^* < I_{gdmin}^* \\ K_{pV}(U_{dc} - U_{dc}^*) + K_{iV} \int (U_{dc} - U_{dc}^*)dt & I_{gdmax}^* > I_{gd}^* > I_{gdmin}^* \\ I_{gdmax}^* & I_{gd}^* > I_{gdmax}^* \end{cases}$$

where $K_{pV}$ represents a proportional coefficient of a DC voltage regulator, and $K_{iV}$ represents an integration coefficient of the DC voltage regulator;

S603: obtaining an active current $I_{gd}$ output from the grid-side converter, a reactive current $I_{gq}$ output from the grid-side converter, a d-axis component of a voltage at the access point of the grid-side converter, a q-axis component of the voltage at the access point of the grid-side converter and a power grid voltage angular velocity $\omega_1$; and S604: according to a resistance $R_g$ and an inductance $L_g$ of a filter in the grid-side converter D that are preset, obtaining a d-axis component $U_{gd}^*$ and a q-axis component $U_{gq}^*$ of a control voltage command for the grid-side converter, in which the d-axis component $U_{gd}^*$ and the q-axis component $U_{gq}^*$ of the control voltage command for the grid-side converter are calculated by the following formulas:

$$\begin{cases} U_{gd}^* = K_{pig}(I_{gd}^* - I_{gd}) + K_{iig} \int (I_{gd}^* - I_{gd})dt + R_g I_{gd} + U_{gd} - \omega_1 L_g I_{gq} \\ U_{gq}^* = K_{pig}(I_{gq}^* - I_{gq}) + K_{iig} \int (I_{gq}^* - I_{gq})dt + R_g I_{gq} + U_{gq} + \omega_1 L_g I_{gd} \end{cases},$$

where $K_{pig}$ represents a proportional coefficient of a grid-connected current controller of the grid-side converter, and $K_{iig}$ represents an integration coefficient of the grid-connected current controller of the grid-side converter.

In general, compared with the prior art, the present invention has the following advantages:

(1) There is a faster excitation response time constant, which is able to meet the needs for dynamic reactive power support;

(2) The AC-excitation induction machine has the variable speed constant frequency (VSCF) capability in the rotor mechanism, and with the cooperation of the variable inertia connection mechanism, can store or release more mechanical kinetic energy through the rotation mechanism, so as to enhance the inertial level of the power grid and a certain inertial support capacity, thereby meeting the requirement of the power grid for the inertial support capability;

(3) Compared with the existing static var condensers based on fully-controlled power electronic devices, this solution has significant economic advantages.

BRIEF DESCRIPTION OF THE DRAWINGS

In all figures, the same elements or structures are denoted by the same reference numerals, in which.

A represents a variable inertia connection mechanism, B represents an AC-excitation induction machine, C represents a full-controlled AC excitation converter, D represents a grid-side converter, E represents a controller, E01 represents an event and command control module, E02 represents a rotating speed and reactive power control module, E03 represents an excitation current control module, and E04 represents a DC voltage control module.

DETAILED DESCRIPTION

For clear understanding of the objectives, features and advantages of the invention, detailed description of the invention will be given below in conjunction with accompanying drawings and specific embodiments. It should be noted that the embodiments described herein are only meant to explain the invention, and not to limit the scope of the invention.

Figure 1:
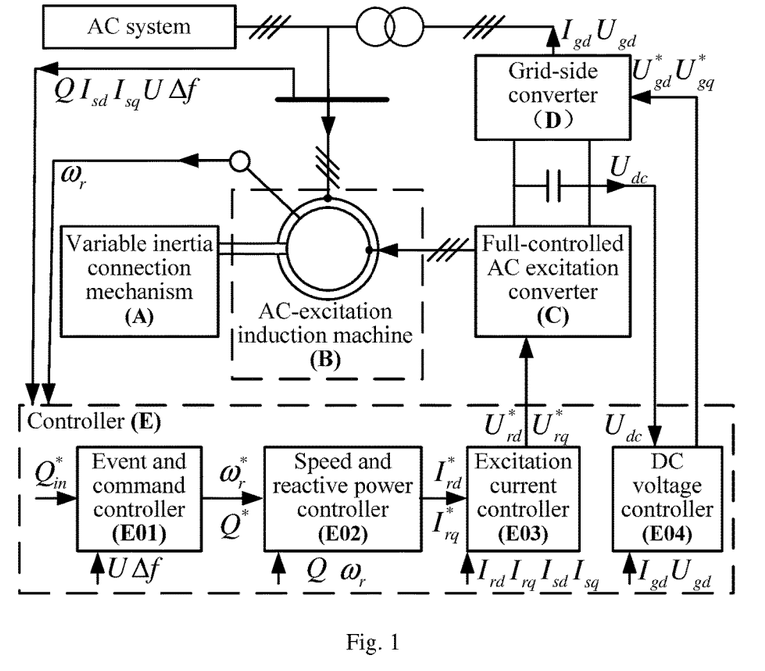
FIG. 1 is a structural block diagram of a AC excitation synchronous condenser according to the present invention.

As shown in FIG. 1, the AC excitation synchronous condenser according to the present invention comprises: a variable inertia connection mechanism A, an AC-excitation induction machine B, a full-controlled AC excitation converter C, a grid-side converter D and a controller E; the AC-excitation induction machine B is the core power converting device, and its stator and rotor windings are AC windings with terminals; the variable inertia connection mechanism A is connected to a rotating mechanism of the AC-excitation induction machine B and changes the moment of inertia of the rotating mechanism of the AC-excitation induction machine B through the additional connecting member or the mass member so as to change the ability of the rotating mechanism of the AC-excitation induction machine B to store mechanical energy; the controller E is configured to process voltage and current signals so as to generate an excitation voltage command for the full-controlled AC excitation converter C and a control voltage command for the grid-side converter D; the full-controlled AC excitation converter C is configured to receive the excitation voltage command generated by the controller E and perform independent AC excitation on the active power and reactive power of the AC-excitation induction machine B, so as to achieve the independent control of the active power and reactive power of the AC-excitation induction machine B; and the grid-side converter D is configured to receive the control voltage command generated by the controller E and regulate the active power so as to maintain the stability of the DC bus voltage, so that it is ensured that the full-controlled AC excitation converter C has sufficient excitation control capability.

The controller E comprises: an event and command control module E01, a rotating speed and reactive power control module E02, an excitation current control module E03 and a DC voltage control module E04;

The event and command control module E01 has a first input terminal for receiving a superior reactive power command $Q_{in}^*$ and a second input terminal for receiving voltage and frequency signals of the local power grid, and is configured to receive the superior reactive power command $Q_{in}{}^*$, collect the measured voltage U and the measured frequency f and then process the input signals according to a rated voltage $U_N$, a rated frequency $f_N$, a maximum rotating speed command $\omega_{r\ max}{}^*$ and a minimum rotating speed command $\omega_{r\ min}{}^*$ that are preset, so as to obtain a reactive power command Q* and a rotating speed command $\omega_r{}^*$;

The rotating speed and reactive power control module E02 has a first input terminal which is connected to a first output terminal of the event and command control module E01, a second input terminal which is connected to a second output terminal of the event and command control module E01, a third input terminal for receiving an instantaneous reactive power Q output from the AC excitation synchronous condenser to the local power grid and a fourth input terminal for receiving a measured rotating speed $\omega_r$ of the AC-excitation induction machine, and is configured to receive the reactive power command Q* and the rotating speed command $\omega_r{}^*$ output from the event and command control module E01, collect the instantaneous reactive power Q output from the AC excitation synchronous condenser to the local power grid and the measured rotating speed $\omega_r$ of the AC-excitation induction machine and then process the input signals according to a rotor maximum reactive current command $I_{rq\ max}{}^*$, a rotor minimum reactive current command $I_{rq\ min}{}^*$, a rotor maximum active current command $I_{rd\ max}{}^*$ and a rotor minimum active current command $I_{rd\ min}{}^*$ that are preset, so as to obtain a rotor reactive current command $I_{rq}{}^*$ and a rotor active current command $I_{rd}{}^*$;

The excitation current control module E03 has a first input terminal which is connected to a first output terminal of the rotating speed and reactive power control module E02, a second input terminal which is connected to a second output terminal of the rotating speed and reactive power control module E02 and a third input terminal for receiving current signals, and is configured to receive the rotor reactive current command $I_{rq}{}^*$ and the rotor active current command $I_{rd}{}^*$ output from the rotating speed and reactive power control module E02, collect a rotor active current $I_{rd}$, a rotor reactive current $I_{rq}$, a stator active current $I_{sd}$ and a stator reactive current $I_{sq}$ of the AC-excitation induction machine B as well as a slip frequency angular velocity $\omega_s$, and then process the input signals according to the maximum excitation current capacity $I_{max}$ of the full-controlled AC excitation converter C, an excitation inductance $L_m$ of the AC-excitation induction machine B and a rotor inductance $L_r$ of the AC-excitation induction machine B, so as to obtain an excitation voltage command for the full-controlled AC excitation converter C, so that the full-controlled AC excitation converter C performs AC excitation of the AC-excitation induction machine B;

The DC voltage control module E04 has a first input terminal for receiving a DC bus voltage $U_{dc}$ and a second input terminal for receiving voltage and current signals of the local power grid, and is configured to receive an actual value of the DC bus voltage $U_{dc}$, collect an active current $I_{gd}$ output from the grid-side converter D, a reactive current $I_{gq}$ output from the grid-side converter D, a d-axis component $U_{gd}$ of a voltage at the access point of the grid-side converter D, a q-axis component $U_{gq}$ of the voltage at the access point of the grid-side converter D and a power grid voltage angular velocity $\omega_1$, and then process the input signals according to a DC bus voltage command $U_{dc}{}^*$, a resistance $R_g$ of the filter in the grid-side converter D and an inductance $L_g$ of the filter in the grid-side converter D to obtain a control voltage of the grid-side converter D, so as to maintain the stability of the DC bus voltage, so that it is ensured that the full-controlled AC excitation converter C has sufficient excitation control capability.

The DC bus voltage command $U_{dc}{}^*$, the rated voltage $U_N$, the rated frequency $f_N$, the maximum rotating speed command $\omega_{r\ max}{}^*$, the minimum rotating speed command $\omega_{r\ min}{}^*$, the rotor maximum reactive current command $I_{rq\ max}{}^*$, the rotor minimum reactive current command $I_{rq\ min}{}^*$, the rotor maximum active current command $I_{rd\ max}{}^*$ and the rotor minimum active current command $I_{rd\ min}{}^*$ are preset parameters according to actual working conditions; and the maximum excitation current capacity $I_{max}$ of the full-controlled AC excitation converter C, the excitation inductance $L_m$ of the AC-excitation induction machine B, the rotor inductance $L_r$ of the AC-excitation induction machine B, the resistance $R_g$ of the filter in the grid-side converter D and the inductance $L_g$ of the filter in the grid-side converter D are parameters of the device itself.

The additional connecting member or mass member of the variable inertia connection mechanism A for changing the moment of inertia of the rotating mechanism of the AC-excitation induction machine B includes an emergency accelerating mechanism and an emergency braking mechanism. Preferably, a flywheel is connected to the variable inertia connection mechanism A to enhance the active power regulation capability of the rotating mechanism of the AC-excitation induction machine B.

The active power support provided by the AC excitation synchronous condenser to the power grid comes from mechanical energy stored in the variable inertia connection mechanism A and the rotor of the AC-excitation induction machine B; the reactive power support provided by the AC excitation synchronous condenser to the power grid comes from excitation of the AC-excitation induction machine B performed by the full-controlled AC excitation converter C and reactive power provided by the grid-side converter D to the power grid; and the controller E is configured to control the balance between the mechanical energy and the electric energy in the AC excitation synchronous condenser and the external supporting behavior.

Both stator and rotor windings in the AC-excitation induction machine B are AC windings with terminals, in which the stator winding is directly connected to the power grid through a grid-connected mechanism, and the rotor winding is connected to the full-controlled AC excitation converter C.

In the present embodiment, the AC-excitation induction machine B is a double-fed motor.

The grid-side converter D has bi-directional power flow capability, namely, being able to not only absorb active power or reactive power from the power grid, but also release active power or reactive power to the power grid so as to maintain the stability of the DC bus voltage.

Frequency modulation (FM) and reactive power regulation are further implemented by additionally adding an energy storage device to the grid-side converter D.

Connection between the full-controlled AC excitation converter C and the grid-side converter D includes direct connection and indirect connection through a converter. In the present embodiment, the full-controlled AC excitation converter C and the grid-side converter D are directly connected.

The converters in the full-controlled AC excitation converter C and the grid-side converter D are two-level power electronic converters.

The controller E adopts a centralized control strategy.

Figure 2:
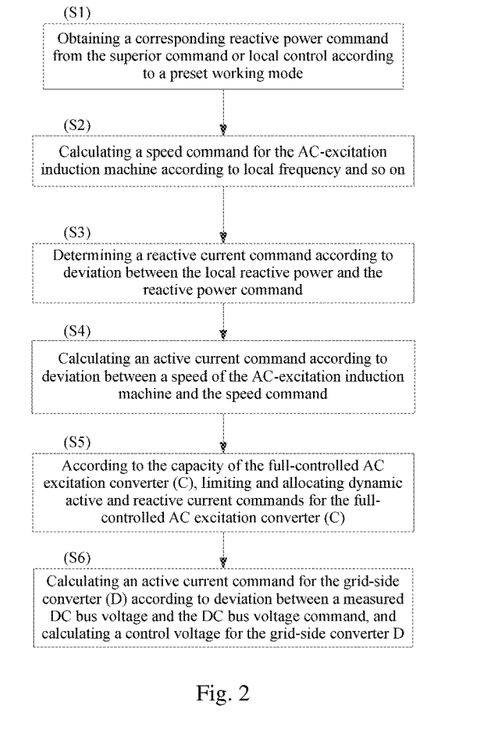
FIG. 2 is a flowchart of a control method according to the present invention.

As shown in FIG. 2, a method according to the present invention comprising the following steps:

S1: obtaining a corresponding reactive power command Q* from the superior command or the local control according to the preset working mode;

S2: obtaining a rotating speed command $\omega_r^*$ according to information about a frequency of the local power grid and a motor speed;

S3: obtaining a rotor reactive current command $I_{rq}^*$ according to deviation between a measured reactive power of the local power grid and the reactive power command;

S4: obtaining a rotor active current command $I_{rd}^*$ according to deviation between a measured rotating speed of the AC-excitation induction machine and the rotating speed command;

S5: limiting and allocating the dynamic active current command and reactive current command according to the capacity of the full-controlled AC excitation converter C, and obtaining an excitation voltage command for the full-controlled AC excitation converter C according to an actual active current command $I_{rdt}^*$ and an actual active current command $I_{rqt}^*$ for the full-controlled AC excitation converter C, so that the full-controlled AC excitation converter C performs independent excitation of the AC-excitation induction machine B; and S6: calculating an active current command for the grid-side converter D according to deviation between a measured DC bus voltage and the DC bus voltage command, and obtaining a control voltage command for the grid-side converter D so as to maintain the stability of the DC bus voltage, so that it is ensured that the full-controlled AC excitation converter C has sufficient excitation control capability.

In the steps S1 to S6, methods for calculating the output signal based on the input signal includes: a proportion-based calculation method, a proportional-integral adjustment method without static error, and an adjustment method based on a set sag curve. In the present embodiment, in the steps S1 to S6, the method for calculating the output signal based on the input signal is the proportional-integral adjustment method without static error so as to reduce the computational complexity and eliminate static errors.

Further, the step S1 specifically includes: receiving a superior reactive power command $Q_{in}^*$ and obtaining a reactive power command $Q^*=Q_{in}^*$, if the set working mode is to obtain a reactive power command from the superior command; or obtaining a measured voltage U of the local power grid and then obtaining a reactive power command $Q^*=K_{pu}(U_N-U)+K_{iu}\int(U_N-U)dt$ (where $K_{pu}$ represents a proportional coefficient of a reactive power regulator, and $K_{iu}$ represents an integration coefficient of the reactive power regulator) through proportional-integral operation, if the set working mode is to obtain a reactive power command from the local control.

Further, the step S2 specifically includes: obtaining a measured frequency f of the local power grid and according to a rated rotating speed synchronization command $\omega_{rN}^*$, a rated frequency $f_N$ of the local power grid, a maximum rotating speed command $\omega_{r\,max}^*$ and a minimum rotating speed command $\omega_{r\,min}^*$ that are preset, obtaining a rotating speed command $\omega_r^*$ through proportional-integral operation, in which the rotating speed command $\omega_r^*$ is calculated by the following formula:

$$\omega_r^* \begin{cases} \omega_{rmin}^* & \omega_r^* < \omega_{rmin}^* \\ K_{pf}(f-f_N)+K_{if}\int(f-f_N)dt & \omega_{rmax}^* > \omega_r^* > \omega_{rmin}^* \\ \omega_{rmax}^* & \omega_r^* > \omega_{rmax}^* \end{cases}$$

where $K_{pf}$ represents a proportional coefficient of a rotating speed command regulator, and $K_{if}$ represents an integration coefficient of the rotating speed command regulator.

Further, the step S3 specifically includes: obtaining a measured reactive power Q of the local power grid, receiving the reactive power command Q*, and according to a rotor maximum reactive current command $I_{rq\,max}^*$ and a rotor minimum reactive current command $I_{rq\,min}^*$ that are preset, obtaining a rotor reactive current command $I_{rq}^*$ through the proportional-integral operation, in which the rotor reactive current command $I_{rq}^*$ is calculated by the following formula:

$$I_{rq}^* \begin{cases} I_{rqmin}^* & I_{rq}^* < I_{rqmin}^* \\ K_{pQ}(Q-Q^*)+K_{iQ}\int(Q-Q^*)dt & I_{rqmax}^* > I_{rq}^* > I_{rqmin}^* \\ I_{rqmax}^* & I_{rq}^* > I_{rqmax}^* \end{cases}$$

where $K_{pQ}$ represents a proportional coefficient of a reactive current regulator, and $K_{iQ}$ represents an integration coefficient of the reactive current regulator.

Further, the step S4 specifically includes: obtaining a measured rotating speed $\omega_r$ of the AC-excitation induction machine, receiving the rotating speed command $\omega_r^*$, and according to a rotor maximum active current command $I_{rd\,max}^*$ and a rotor minimum active current command $I_{rd\,min}^*$ that are preset, obtaining a rotor active current command $I_{rd}^*$ through the proportional-integral operation, in which the rotor active current command $I_{rd}^*$ is calculated by the following formula:

$$I_{rd}^* \begin{cases} I_{rdmin}^* & I_{rd}^* < I_{rdmin}^* \\ K_{p\omega}(\omega_r^*-\omega_r)+K_{i\omega}\int(\omega_r^*-\omega_r)dt & I_{rdmax}^* > I_{rd}^* > I_{rdmin}^* \\ I_{rdmax}^* & I_{rd}^* > I_{rdmax}^* \end{cases}$$

where $K_{p\omega}$ represents a proportional coefficient of a speed regulator, and $K_{i\omega}$ represents an integration coefficient of the speed regulator.

Further, the step S5 specifically includes:

S501: receiving the rotor reactive current command $I_{rq}^*$ and the rotor active current command $I_{rd}^*$;

S502: limiting and allocating the dynamic active current command and reactive current command according to a maximum excitation current capacity $I_{max}$ of the full-controlled AC excitation converter C, so as to obtain an actual active current command $I_{rdt}^*$ and an actual reactive current command $I_{rqt}^*$ of the full-controlled AC excitation converter C;

S503: obtaining an actual active current $I_{rd}$ of the full-controlled AC excitation converter C, an actual reactive current $I_{rq}$ of the full-controlled AC excitation converter C, a stator active current $I_{sd}$ of the AC-excitation induction machine B, a stator reactive current $I_{sq}$ of the AC-excitation induction machine B and a slip frequency angular velocity $\omega_s$;

S504: according to an excitation inductance $L_m$ and a rotor inductance $L_r$ of the AC-excitation induction machine B, obtaining a d-axis component $U_{rd}^*$ and a q-axis component $U_{rq}^*$ of the excitation voltage command through the proportional-integral operation, in which the d-axis component $U_{rd}^*$ and q-axis component $U_{rq}^*$ of the excitation voltage command are calculated by the following formulas:

$$\begin{cases} U_{rd}^* = K_{pi}(I_{rdt}^* - I_{rd}) + K_{ii}\int(I_{rdt}^* - I_{rd})dt + R_r I_{rd} - \omega_s(L_m I_{sq} + L_r I_{rq}) \\ U_{rq}^* = K_{pi}(I_{rqt}^* - I_{rq}) + K_{ii}\int(I_{rqt}^* - I_{rq})dt + R_r I_{rq} + \omega_s(L_m I_{sd} + L_r I_{rd}) \end{cases},$$

where $K_{pi}$ represents a proportional coefficient of an excitation current control, and $K_{ii}$ represents an integration coefficient of the excitation current control.

Preferably, in the step S502, the way of limiting and allocating the dynamic active current command and reactive current command is a way that the reactive current is preferred, so as to ensure the reactive power support provided by the AC excitation synchronous condenser to the power grid. After the limitation and allocation, the actual active current command $I_{rdt}^*$ and the actual active current command $I_{rqt}^*$ are calculated by the following formulas:

$$\begin{cases} (I_{rdt}^* = I_{rd}^*, I_{rqt}^* = I_{rq}^*) & \sqrt{I_{rd}^{*2} + I_{rq}^{*2}} \leq I_{max} \\ (I_{rdt}^* = \text{Sgn}(I_{rd}^*)\sqrt{\max(I_{max}^2 - I_{rq}^{*2}, 0)}, I_{rqt}^* = I_{rq}^*) & \sqrt{I_{rd}^{*2} + I_{rq}^{*2}} > I_{max} \end{cases},$$

$$\text{where Sgn}(I_{rd}^*) = \begin{cases} 1 & I_{rd}^* > 0 \\ 0 & I_{rd}^* = 0 \\ -1 & I_{rd}^* < 0 \end{cases}.$$

Further, the step S6 specifically includes:

S601: receiving a DC bus voltage command LI: and obtaining a measured DC bus voltage $U_{dc}$;

S602: according to the maximum active current command $I_{gd\,max}^*$ and the minimum active current command $I_{gd\,min}^*$ output from the grid-side converter D, obtaining an active current command $I_{gd}^*$ output from the grid-side converter D through proportional-integral operation, in which the active current command $I_{gd}^*$ is calculated by the following formula:

$$I_{gd}^* \begin{cases} I_{gdmin}^* & I_{gd}^* < I_{gdmin}^* \\ K_{pV}(U_{dc} - U_{dc}^*) + K_{iV}\int(U_{dc} - U_{dc}^*)dt & I_{gdmax}^* > I_{gd}^* > I_{gdmin}^* \\ I_{gdmax}^* & I_{gd}^* > I_{gdmax}^* \end{cases};$$

where $K_{pV}$ represents a proportional coefficient of a DC voltage regulator, and $K_{iV}$ represents an integration coefficient of the DC voltage regulator;

S603: obtaining an active current $I_{gd}$ output from the grid-side converter D, a reactive current $I_{gq}$ output from the grid-side converter D, a d-axis component of a voltage at the access point of the grid-side converter D, a q-axis component of the voltage at the access point of the grid-side converter D and a power grid voltage angular velocity $\omega_1$; and S604: according to a resistance $R_g$ and an inductance $L_g$ of a filter in the grid-side converter D that are preset, obtaining a d-axis component $U_{gd}^*$ and a q-axis component $U_{gq}^*$ of the control voltage command for the grid-side converter D, in which the d-axis component $U_{gd}^*$ and the q-axis component $U_{gq}^*$ are calculated by the following formulas:

$$\begin{cases} U_{gd}^* = K_{pig}(I_{gd}^* - I_{gd}) + K_{iig}\int(I_{gd}^* - I_{gd})dt + R_g I_{gd} + U_{gd} - \omega_1 L_g I_{gq} \\ U_{gq}^* = K_{pig}(I_{gq}^* - I_{gq}) + K_{iig}\int(I_{gq}^* - I_{gq})dt + R_g I_{gq} + U_{gq} + \omega_1 L_g I_{gd} \end{cases},$$

where $K_{pig}$ represents a proportional coefficient of a grid-connected current controller of the grid-side converter D, and $K_{iig}$ represents an integration coefficient of the grid-connected current controller of the grid-side converter D.

Figure 3:
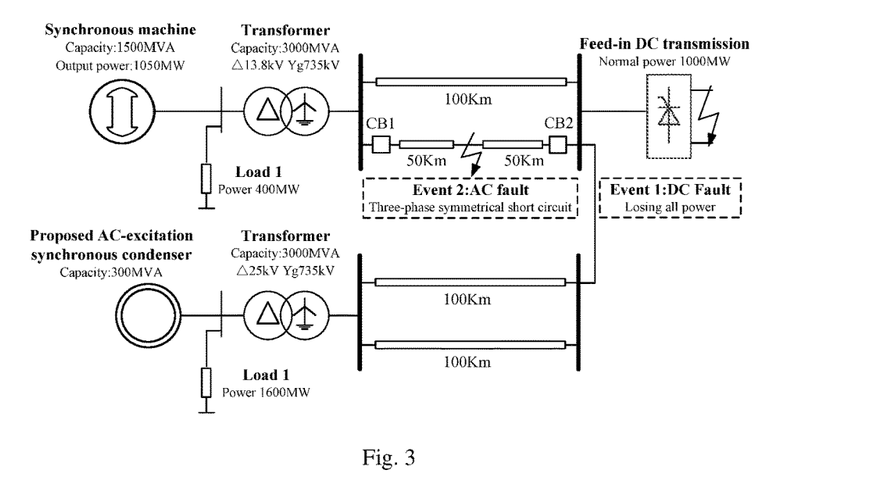
FIG. 3 is an application example of the AC excitation synchronous condenser and the control method according to the present invention.

FIG. 3 shows a typical application example of the present invention, in which the receiving-end power grid consists of feed-in DC transmission, a local synchronous machine, one or more loads, transmission lines and a transformer. In addition, an AC excitation synchronous condenser is installed on the important load side, and the support effect of this device can be verified and explained through allowing the device to be in or out of service. The two typical extreme voltage and frequency events in this system are the interruption of transmission power due to occurrence of DC transmission block and the overall disturbance of the system voltage and frequency due to three-phase short circuit in the AC transmission lines.

Figure 4:
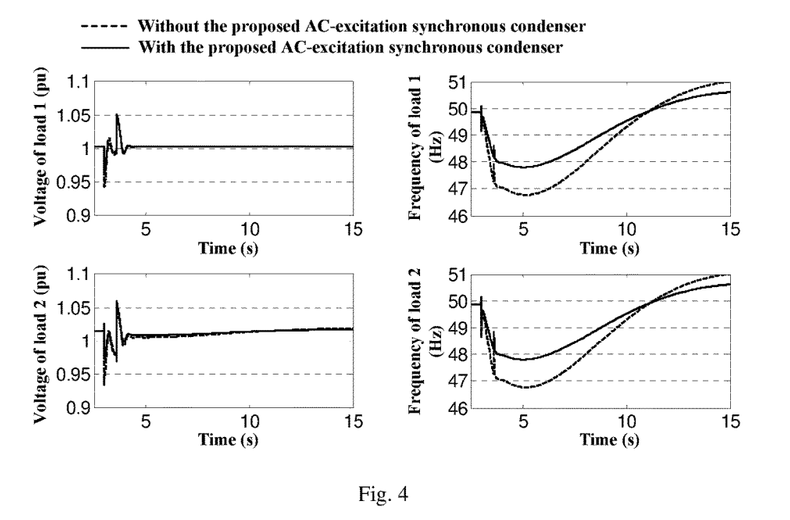
FIG. 4 is a schematic diagram of application effects of the present invention in a DC blocking event.

In the DC transmission block event of the receiving-end power grid shown in FIG. 3, the fault occurs at a time of 3 seconds, and the transmission power recovery occurs at a time of 3.6 seconds. As shown in FIG. 4, the AC excitation synchronous condenser can effectively suppress frequency fluctuations at the loads 1 and 2.

Figure 5:
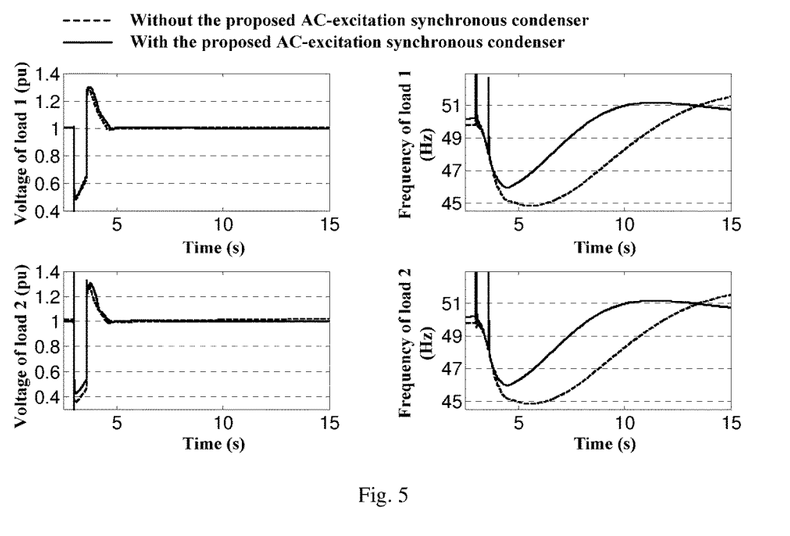
FIG. 5 is a schematic diagram of application effects of the present invention in an AC short circuit event.

In the AC fault event shown in FIG. 3, the fault occurs at a time of 3 seconds, and the transmission power recovery occurs at a time of 3.6 seconds. As shown in FIG. 5, the AC excitation synchronous condenser can effectively suppress voltage and frequency fluctuations at the loads 1 and 2.

In conjunction with FIG. 3 to FIG. 5, the AC excitation synchronous condenser and its control method according to the present invention have significant voltage and frequency support effects in a typical application example.

While particular embodiments of the invention have been shown and described, it will be obvious to those skilled in the art that changes and modifications may be made without departing from the spirit and scope of the invention.

The invention claimed is:

1. An AC excitation synchronous condenser, comprising: an AC-excitation induction machine, a full-controlled AC excitation converter, a grid-side converter and a controller; wherein the AC-excitation induction machine is the core power converting device, and stator and rotor windings of the AC-excitation induction machine are AC windings with terminals; wherein the controller is configured to process voltage, current and rotating speed signals so as to generate an excitation voltage command for the full-controlled AC excitation converter and control voltage command for the grid-side converter and comprises: an event and command control module, a rotating speed and reactive power control module, an excitation current control module and a DC voltage control module;

the event and command control module has a first input terminal for receiving a superior reactive power command ($Q_{in}^*$) and a second input terminal for receiving voltage and frequency signals of the local power grid, and is configured to receive the superior reactive power command ($Q_{in}^*$), collect a measured voltage (U) and a measured frequency f and then process the input signals according to a working mode, a rated voltage $U_N$, a rated frequency $f_N$, a maximum rotating speed command $\omega_{r\ max}^*$ and a minimum rotating speed command $\omega_{r\ min}^*$ that are preset, so as to obtain a reactive power command ($Q^*$) and a rotating speed command ($\omega_r^*$);

the rotating speed and reactive power control module has a first input terminal which is connected to a first output terminal of the event and command control module, a second input terminal which is connected to a second output terminal of the event and command control module, a third input terminal for receiving an instantaneous reactive power (Q) output from the AC excitation synchronous condenser to the local power grid and a fourth input terminal for receiving a measured rotating speed ($\omega_r$) of the AC-excitation induction machine, and is configured to receive the reactive power command ($Q^*$) and the rotating speed command ($\omega_r^*$), collect the instantaneous reactive power (Q) and the measured rotating speed ($\omega_r$) and then process the input signals according to a rotor maximum reactive current command $I_{rq\ max}^*$, a rotor minimum reactive current command $I_{rq\ min}^*$, a rotor maximum active current command $I_{rd\ max}^*$ and a rotor minimum active current command $I_{rd\ min}^*$ that are preset, so as to obtain a rotor reactive current command $I_{rq}^*$ and a rotor active current command $I_{rd}^*$;

the excitation current control module has a first input terminal which is connected to a first output terminal of the rotating speed and reactive power control module, a second input terminal which is connected to a second output terminal of the rotating speed and reactive power control module and a third input terminal for receiving current signals, and is configured to receive the rotor reactive current command $I_{rq}^*$ and the rotor active current command $I_{rd}^*$, collect a rotor active current $I_{rd}$, a rotor reactive current $I_{rq}$, a stator active current $I_{sd}$ and a stator reactive current $I_{sq}$ of the AC-excitation induction machine as well as a slip frequency angular velocity $\omega_s$, and then process the input signals according to a maximum excitation current capacity $I_{max}$ of the full-controlled AC excitation converter, an excitation inductance $L_m$ of the AC-excitation induction machine and a rotor inductance $L_r$ of the AC-excitation induction machine, so as to obtain an excitation voltage command for the full-controlled AC excitation converter, so that the full-controlled AC excitation converter is controlled to perform AC excitation of the AC-excitation induction machine;

the DC voltage control module has a first input terminal for receiving a DC bus voltage ($U_{dc}$) and a second input terminal for receiving voltage and current signals of the local power grid, and is configured to receive the DC bus voltage ($U_{dc}$), collect an active current ($I_{gd}$) and a reactive current $I_{gq}$ output from the grid-side converter, a d-axis component $U_{gd}$ and a q-axis component $U_{gq}$ of a voltage at the access point of the grid-side converter and a power grid voltage angular velocity $\omega_1$, and then process the input signals according to a DC bus voltage command $U_{dc}^*$, a resistance $R_g$ of a filter in the grid-side converter and an inductance $L_g$ of the filter in the grid-side converter to obtain a control voltage of the grid-side converter, so as to maintain the stability of the DC bus voltage, so that it is ensured that the full-controlled AC excitation converter has sufficient excitation control capability;

the full-controlled AC excitation converter is configured to receive the excitation voltage command and perform independent regulation on the active power and the reactive power of the AC-excitation induction machine; and the grid-side converter is configured to receive the control voltage command and regulate the active power input from the grid-side converter so as to maintain the stability of the DC bus voltage, so that it is ensured that the full-controlled AC excitation converter has sufficient excitation control capability.

2. A control method for an AC excitation synchronous condenser, comprising:

S1: obtaining a corresponding reactive power command $Q^*$ from the superior command or the local control according to a preset working mode;

S2: obtaining a rotating speed command $\omega_r^*$ according to information about a frequency of the local power grid and a motor speed;

S3: obtaining a rotor reactive current command $I_{rq}^*$ according to deviation between a measured reactive power of the local power grid and the reactive power command;

S4: obtaining a rotor active current command $I_{rd}^*$ according to deviation between a measured rotating speed of the AC-excitation induction machine and the rotating speed command;

S5: limiting and allocating the dynamic active current command and reactive current command according to the capacity of the full-controlled AC excitation converter, and obtaining an excitation voltage command for the full-controlled AC excitation converter, so that the full-controlled AC excitation converter performs independent excitation of the AC-excitation induction machine; and S6: calculating an active current command for the grid-side converter according to deviation between a measured DC bus voltage and the DC bus voltage command, and obtaining a control voltage command for the grid-side converter, so as to maintain the stability of the DC bus voltage, so that it is ensured that the full-controlled AC excitation converter has sufficient excitation control capability.

3. The control method of claim 2, wherein the step S1 specifically includes: if the set working mode is to obtain a reactive power command from the superior command, receiving a superior reactive power command ($Q_{in}^*$) and obtaining a reactive power command $Q^*=Q_{in}^*$; or if the set working mode is to obtain a reactive power command from the local control, obtaining a measured voltage (U) of the local power grid and then obtaining a reactive power command $Q^*=K_{pu}(U_N-U)+K_{iu}\int(U_N-U)dt$ through proportional-integral operation, where $K_{pu}$ represents a proportional coefficient of a reactive power regulator, and $K_{iu}$ represents an integration coefficient of the reactive power regulator.

4. The control method of claim 2, wherein the step S2 specifically includes: obtaining a measured frequency f of the local power grid and according to a rated rotating speed synchronization command $\omega_{rN}^*$, a rated frequency $f_N$ of the local power grid, a maximum rotating speed command $\omega_{r\ max}^*$ and a minimum rotating speed command $\omega_{r\ min}^*$ that are preset, obtaining a rotating speed command ($\omega_r^*$)

through proportional-integral operation, in which the rotating speed command ($\omega_r^*$) is calculated by the following formula:

$$\omega_r^* \begin{cases} \omega_{rmin}^* & \omega_r^* < \omega_{rmin}^* \\ K_{pf}(f - f_N) + K_{if} \int (f - f_N)dt & \omega_{rmax}^* > \omega_r^* > \omega_{rmin}^* \\ \omega_{rmax}^* & \omega_r^* > \omega_{rmax}^* \end{cases}$$

where $K_{pf}$ represents a proportional coefficient of a rotating speed command regulator, and $K_{if}$ represents an integration coefficient of the rotating speed command regulator.

5. The control method of claim 2, wherein the step S3 specifically includes: obtaining an instantaneous reactive power Q output from the AC excitation synchronous condenser to the local power grid, receiving the reactive power command ($Q^*$), and according to a rotor maximum reactive current command $I_{rq\_max}^*$ and a rotor minimum reactive current command $I_{rq\_min}^*$ that are preset, obtaining a rotor reactive current command ($I_{rq}^*$) through proportional-integral operation, in which the rotor reactive current command ($I_{rq}^*$) is calculated by the following formula:

$$I_{rq}^* \begin{cases} I_{rqmin}^* & I_{rq}^* < I_{rqmin}^* \\ K_{pQ}(Q - Q^*) + K_{iQ} \int (Q - Q^*)dt & I_{rqmax}^* > I_{rq}^* > I_{rqmin}^* \\ I_{rqmax}^* & I_{rq}^* > I_{rqmax}^* \end{cases}$$

where $K_{pQ}$ represents a proportional coefficient of an reactive current regulator, and $K_{iQ}$ represents an integration coefficient of the reactive current regulator.

6. The control method of claim 2, wherein the step S4 specifically includes: obtaining a measured rotating speed ($\omega_r$), of the AC-excitation induction machine, receiving the rotating speed command ($\omega_r^*$), and according to a rotor maximum active current command $I_{rd\_max}^*$ and a rotor minimum active current command $I_{rd\_min}^*$ that are preset, obtaining a rotor active current command ($I_{rd}^*$) through proportional-integral operation, in which the rotor active current command ($I_{rd}^*$) is calculated by the following formula:

$$I_{rd}^* \begin{cases} I_{rdmin}^* & I_{rd}^* < I_{rdmin}^* \\ K_{p\omega}(\omega_r^* - \omega_r) + K_{i\omega} \int (\omega_r^* - \omega_r)dt & I_{rdmax}^* > I_{rd}^* > I_{rdmin}^* \\ I_{rdmax}^* & I_{rd}^* > I_{rdmax}^* \end{cases}$$

where $K_{p\omega}$ represents a proportional coefficient of a speed regulator, and $K_{i\omega}$ represents an integration coefficient of the speed regulator.

7. The control method of claim 2, wherein the step S5 specifically includes the following steps:

S501: receiving the rotor reactive current command ($I_{rq}^*$) and the rotor active current command ($I_{rd}^*$);

S502: according to a maximum excitation current capacity $I_{max}$ of the full-controlled AC excitation converter, limiting and allocating the dynamic active current command and reactive current command in a manner that the reactive current is preferred, so as to obtain an actual active current command $I_{rdt}^*$ and an actual reactive current command $I_{rqt}^*$ of the full-controlled AC excitation converter; after the limitation and allocation, the actual active current command $I_{rdt}^*$ and the actual active current command $I_{rqt}^*$ of the full-controlled AC excitation converter are calculated by the following formulas:

$$\begin{cases} (I_{rdt}^* = I_{rd}^*, I_{rqt}^* = I_{rq}^*) & \sqrt{I_{rd}^{*2} + I_{rq}^{*2}} \leq I_{max} \\ (I_{rdt}^* = \text{Sgn}(I_{rd}^*)\sqrt{\max(I_{max}^2 - I_{rq}^{*2}, 0)}, I_{rqt}^* = I_{rq}^*) & \sqrt{I_{rd}^{*2} + I_{rq}^{*2}} > I_{max} \end{cases}$$

where $\text{Sgn}(I_{rd}^*) = \begin{cases} 1 & I_{rd}^* > 0 \\ 0 & I_{rd}^* = 0 \\ -1 & I_{rd}^* < 0 \end{cases}$;

S503: obtaining a rotor active current ($I_{rd}$), a rotor reactive current ($I_{rq}$), a stator active current ($I_{sd}$) and a stator reactive current ($I_{sq}$) of the AC-excitation induction machine as well as a slip frequency angular velocity $\omega_s$; and S504: according to an excitation inductance $L_m$ and a rotor inductance $L_r$ of the AC-excitation induction machine, obtaining a d-axis component ($U_{rd}^*$) and a q-axis component ($U_{rq}^*$) of an excitation voltage command through the proportional-integral operation, in which the d-axis component ($U_{rd}^*$) and q-axis component ($U_{rq}^*$) of the excitation voltage command are calculated by the following formulas:

$$\begin{cases} U_{rd}^* = K_{pi}(I_{rdt}^* - I_{rd}) + K_{ii} \int (I_{rdt}^* - I_{rd})dt + R_r I_{rd} - \omega_s(L_m I_{sq} + L_r I_{rq}) \\ U_{rq}^* = K_{pi}(I_{rqt}^* - I_{rq}) + K_{ii} \int (I_{rqt}^* - I_{rq})dt + R_r I_{rq} + \omega_s(L_m I_{sd} + L_r I_{rd}) \end{cases}$$

where $K_{pi}$ represents a proportional coefficient of the excitation current control, and $K_{ii}$ represents an integration coefficient of the excitation current control.

8. The control method of claim 2, wherein the step S6 specifically includes the following steps:

S601: receiving a DC bus voltage command $U_{dc}^*$ and obtaining a measured DC bus voltage $U_{dc}$;

S602: according to a maximum active current command $I_{gd\_max}^*$ and a minimum active current command $I_{gd\_min}^*$ that are preset and output from the grid-side converter, obtaining an active current command ($I_{gd}^*$) output from the grid-side converter through proportional-integral operation, in which the active current command ($I_{gd}^*$) output from the grid-side converter is calculated by the following formula:

$$I_{gd}^* \begin{cases} I_{gdmin}^* & I_{gd}^* < I_{gdmin}^* \\ K_{pV}(U_{dc} - U_{dc}^*) + K_{iV} \int (U_{dc} - U_{dc}^*)dt & I_{gdmax}^* > I_{gd}^* > I_{gdmin}^* \\ I_{gdmax}^* & I_{gd}^* > I_{gdmax}^* \end{cases}$$

where $K_{pV}$ represents a proportional coefficient of a DC voltage regulator, and $K_{iV}$ represents an integration coefficient of the DC voltage regulator;

S603: obtaining an active current ($I_{gd}$) and a reactive current $I_{gq}$ output from the grid-side converter, a d-axis component ($U_{gd}$) and a q-axis component $U_{gq}$ of a voltage at the access point of the grid-side converter and a power grid voltage angular velocity $\omega_1$; and S604: according to a resistance $R_g$ and an inductance $L_g$ of a filter in the grid-side converter, obtaining a d-axis component ($U_{gd}^*$) and a q-axis component ($U_{gq}^*$) of a control voltage command for the grid-side converter, in which the d-axis component ($U_{gd}^*$) and the q-axis component ($U_{gq}^*$) of the control voltage command for the grid-side converter are calculated by the following formulas:

$$\begin{cases} U_{gd}^* = K_{pig}(I_{gd}^* - I_{gd}) + K_{iig}\int (I_{gd}^* - I_{gd})dt + R_g I_{gd} + U_{gd} - \omega_1 L_g I_{gq} \\ U_{gq}^* = K_{pig}(I_{gq}^* - I_{gq}) + K_{iig}\int (I_{gq}^* - I_{gq})dt + R_g I_{gq} + U_{gq} + \omega_1 L_g I_{gd} \end{cases},$$

where $K_{pig}$ represents a proportional coefficient of a grid-connected current controller of the grid-side converter, and $K_{iig}$ represents an integration coefficient of the grid-connected current controller of the grid-side converter.

* * * * *